Feb. 3, 1931. B. F. MIESSNER 1,790,874
ELECTRICAL AMPLIFIER SYSTEM
Original Filed June 19, 1926 3 Sheets-Sheet 3
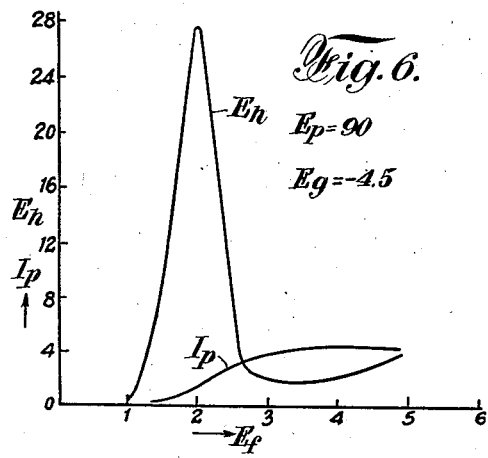
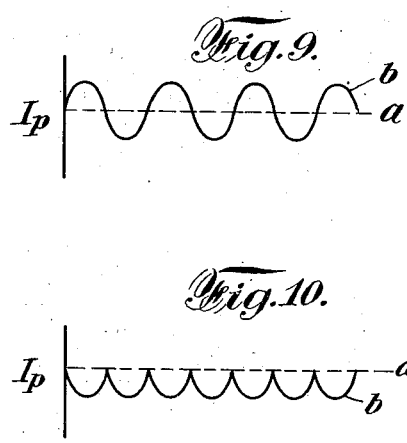
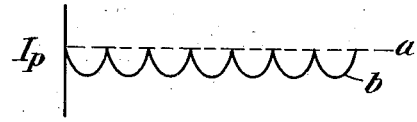
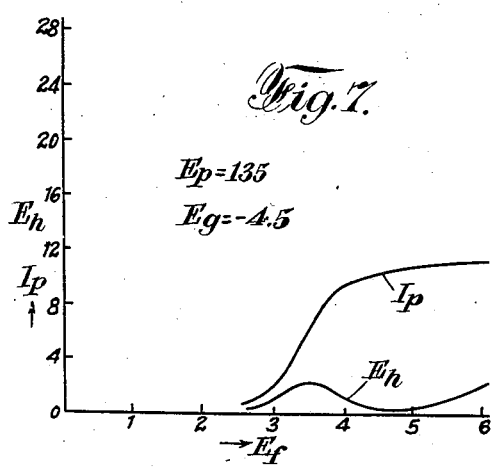
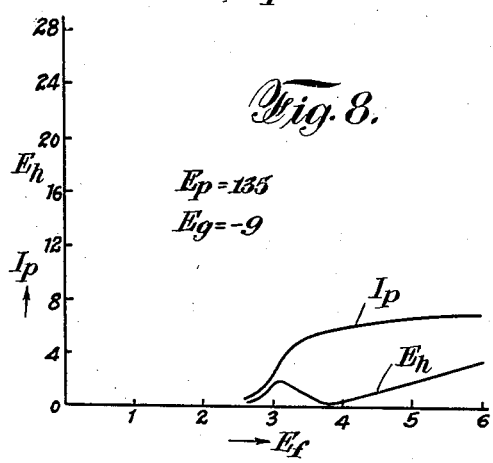
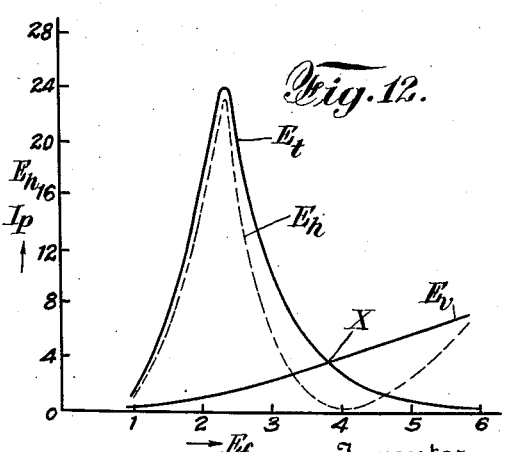
Inventor
Benjamin F. Miessner
By Attorney Patented Feb. 3, 1931

1,790,874

UNITED STATES PATENT OFFICE

BENJAMIN F. MIESSNER, OF SOUTH ORANGE, NEW JERSEY, ASSIGNOR, BY MESNE ASSIGNMENTS, TO RADIO CORPORATION OF AMERICA, OF NEW YORK, N. Y., A CORPORATION OF DELAWARE

ELECTRICAL AMPLIFIER SYSTEM

Original application filed June 19, 1926, Serial No. 117,076. Divided and this application filed November 16, 1926. Serial No. 148,724.

This invention relates to electrical amplifier systems, employing three-electrode vacuum tubes as repeaters or amplifiers. More particularly my invention relates to systems of this character wherein the filaments of one or more of the vacuum tubes of the system are heated by alternating or pulsating current, this application being a division of my application Serial Number 117,076 filed June 19, 1926.

Heretofore the heating of such filaments by alternating current has resulted in disturbances in the system which have interfered materially with its operation. If the system is a signal receiving system adapted to convert electrical signal impulses into audible signals, the use of alternating current in the tube filament has produced an excessive audible hum which masks the audible signals. I have discovered that by employing vacuum tubes of a certain form and construction that the disturbances in the system due to the alternating current in the filaments can to a large extent be eliminated. I have also discovered that by operating these tubes at certain plate, grid and filament potentials, I am able still further to reduce the disturbing effects and at the same time to secure the desired amplification of the signal impulses.

Figure 1:
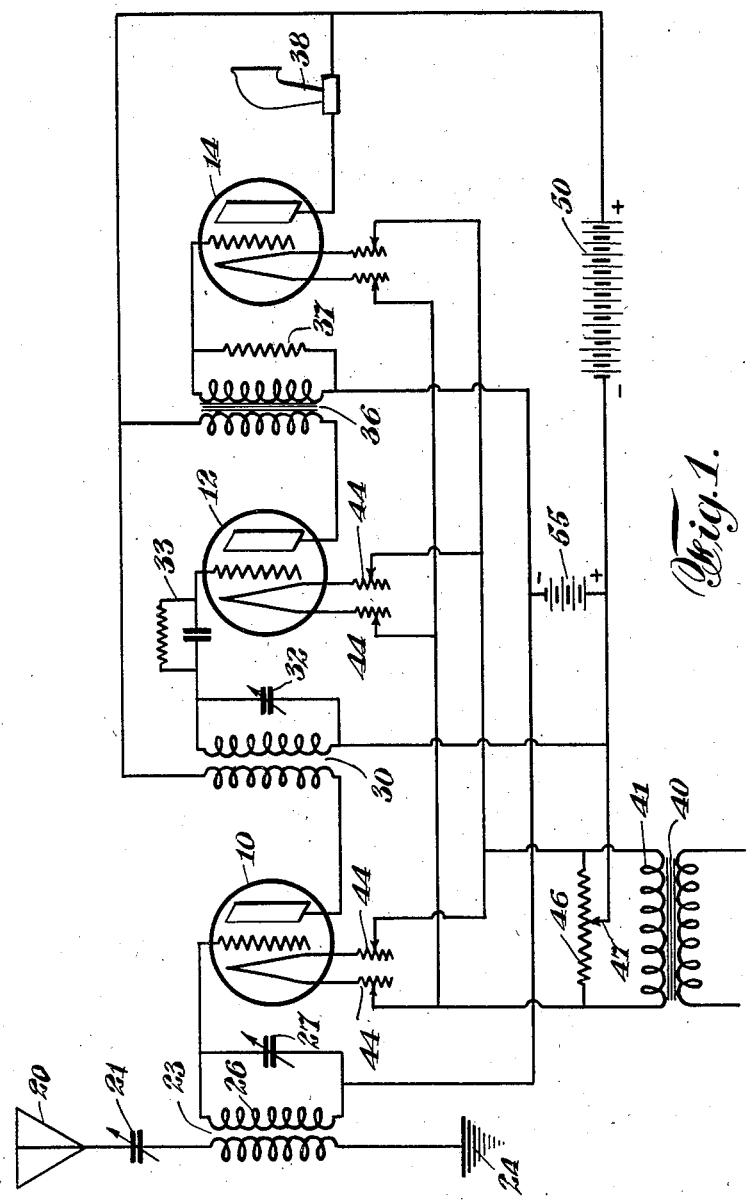

The particular construction of such tubes as well as the manner in which they are arranged and operated in the system will be more particularly pointed out in the following description taken in connection with the accompanying drawing wherein:

Figure 1 illustrates diagrammatically a radio receiving system embodying one form of my invention.

Figure 2:
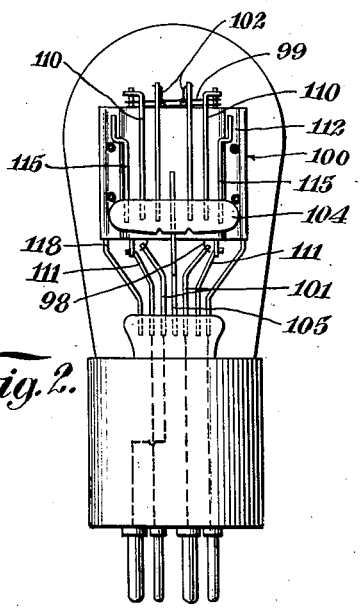
Figure 3:
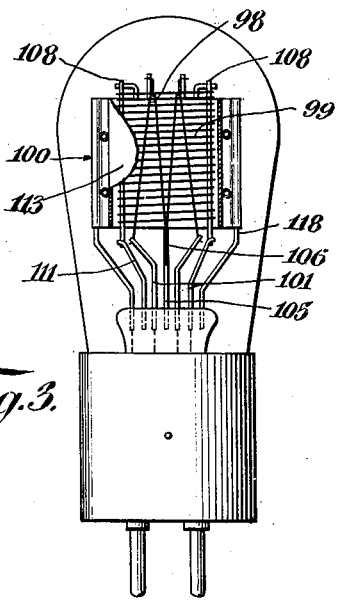
Figure 4:
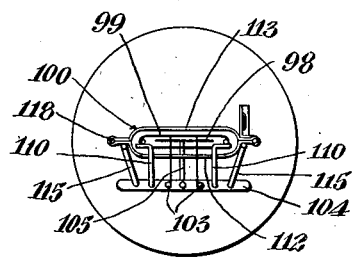

Figures 2 to 4 inclusive are respectively opposite side view and top plan views of a vacuum tube which I employ in my system for certain stages of amplification.

Figure 5:
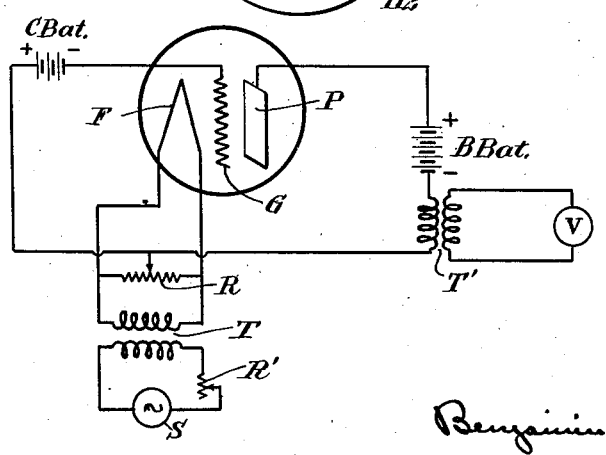

Figure 5 is a circuit diagram of an apparatus for determining the amount of hum produced in the output of a vacuum tube when the filament is heated by alternating current.

Figures 6 to 8 inclusive are curves illustrating the results of hum tests of tubes of certain types and Figures 9 to 12 inclusive are curves explanatory of the effects produced when alternating current is used for heating the tube filament.

Referring to the system shown in Figure 1 the three-electrode vacuum tube 10 is a radio frequency amplifier, the vacuum tube 12 is a detector and the vacuum tube 14 is a low or audio frequency amplifier. The amplifier tubes 10 and 14 are of special construction as will be more particularly described hereafter. At 20 is shown an antenna for collecting radio frequency energy, having a variable condenser 21 and a primary winding of a transformer 23 in series therewith, the antenna being grounded at 24. The secondary winding 26 of transformer 23, cooperating with a variable condenser 27 permits of tuning the grid circuit of a vacuum tube 10 to a frequency of any desired incoming signals. The detector tube 12 is selectively associated with the vacuum tube 10 through the transformer 30 and a variable condenser 32, the element 33 being the usual "grid leak-stopping-condenser combination" customarily employed in connection with detector action. The audio frequency amplifier tube 14 is associated with tube 12 through a suitable audio frequency transformer 36 shown to have a resistance 37 connected across its secondary winding, this being one of the usual methods in the art to insure stable operation of an audio frequency amplifier. A loud speaker or other suitable signal translating device 38 is energized by the final amplified signal current from the amplifier 14. While I have disclosed a system having but one radio frequency amplifying stage and one audio frequency amplifying stage, it will be understood that I may, if desired, employ in my system a plurality of either or both of such stages.

The filaments of the tubes in the system shown are heated by alternating current, and for this purpose I show at 40 an alternating current transformer, the primary of which may be supplied from the usual alternating current house-lighting mains. The filaments of the tubes are connected to the secondary 41 of the transformer 40, the filaments being connected in parallel with each other as shown. The current through each of the filaments is adapted to be controlled by adjustable resistances 44, one of such resistances being included in each filament lead. Connected across the secondary 41 of transformer 40 is a resistance 46, which is adapted to be engaged at points along its length by an adjustable contact or tap 47. The function of resistances 40 and contact 47 as well as certain advantages to be gained by adjusting the contact to certain points of the resistance 47 will be more particularly pointed out hereafter.

Reference numeral 50 represents a comparatively high voltage battery for energizing the plate circuits of the tubes. The positive terminal of the battery 50 is connected to the plate of tube 14 through the loud speaker 38. This terminal of battery 50 is also connected to the plate of tube 12 through primary of transformer 36 and to plate of tube 10 through primary of transformer 30. Contact or tap 47 is connected to the negative side of battery 50 and forms a return path to the battery for the plate currents from the filaments. Detector tube 12 is operated without any substantial bias. Its grid is connected to its filament through the secondary of transformer 30, tap 47, resistance 46 and the filament supply circuit. Tubes 10 and 14 are operated at a grid bias supplied by the grid biasing battery 55, these grids being connected to the filament supply circuit through battery 55, tap 47 and resistance 46.

The important object of the present invention is to eliminate effectively from the system, so far as the translating device is concerned, low frequency disturbances or hum, caused by the alternating filament heating current. One step taken in this direction consists in connecting the grid circuits to the tap 47 leading to a contact on the resistance of potentiometer 46. By keeping this contact at approximately the center of resistance 46, it is approximately at a point of no change in potential with respect to the alternating current supplied by the transformer 41, and therefore the grids of the tubes do not vary substantially in potential due to the alternating current. As will be later described, the tap 47 in certain cases is not adjusted exactly at the mid-point or point of no potential variation for definite reasons.

Another step toward preventing low frequency disturbances produced by the alternating heating current relates to the use of amplifier tubes having certain characteristics and to the operation of these tubes at certain conditions of plate, grid and filament potentials.

I find that a tube of the form and size disclosed in Figures 2 to 4 inclusive, is well adapted for operation with alternating current in the filament circuit, and if used in the radio frequency and audio frequency stages of the system shown in Figure 1, or in the first of the audio frequency stages, if more than one of such stages is employed, greatly improves the non-hum-producing characteristics of the system. This tube comprises a filament 98, grid 99 and plate 100. The filament 98 is formed of wire coated with an alkaline earth oxide designed for operation at a dull red heat. At five volts the filament takes .5 amperes. The filament has the form of an inverted W, the ends of which are connected to leading in wires 101 sealed through the glass neck of the tube. The top bends of the filament are supported by downwardly extending hooks 102 formed of fine wire, which are secured at points above and to one side of the filament to vertical supporting wires or rods 103 which are sealed at their lower ends in a side glass member 104. Wire 105, sealed in the neck of the tube and in the glass member 104 assists in maintaining the member 104 in position spaced from and at one side of the plate 100. A wire 106 connecting the middle bend of the filament 98 with the wire 105 holds the middle bend of the filament in position.

The grid 99 which surrounds the filament is a flat coil of fine wire wound on the spaced vertical rods 108, the upper ends of which are held in position by wires 110 carried by the glass member 104. The lower ends of the rods 108 are secured to the wires 110 which are sealed in the glass neck; one of the wires 110 extending through the neck and forming the leading in terminal of the grid.

The plate 100 which is spaced from and surrounds the grid 99 is formed of two thin sheet metal side members 112 and 113 bent toward one another and joined together near their side edges. The plate 100 is supported at its top by rods 115 which are carried by the glass member 104 and the outer edges of the sheet metal members 112 and 113 are pinched around wires 118 which extend downwardly and are sealed into the glass neck of the tube. One of the wires 118 extends through the neck and forms the leading in terminal of the plate.

In practice when the tube shown in Figures 2 to 4 is employed as radio and audio frequency amplifiers, such as tubes 10 and 14 of Figure 1, I preferably operate those tubes at a plate voltage of approximately 135, a grid voltage of approximately −4.5 and a filament voltage of approximately 4.5.

For the purpose of determining what form of tube is best adapted for use as an amplifying tube in the system shown in Figure 1 or in other systems wherein the filament of the tube is heated by alternating current, particularly with a view to reducing low frequency disturbances or hum in the output circuit and also to determine what variations may be produced in the intensity of the hum in the output circuit by varying the plate, grid and filament voltage, I have made use of the apparatus illustrated diagrammatically in Figure 5. In this figure I illustrate the tube under test as having the so-called hairpin shaped filament F, grid G, and plate P. The grid circuit includes a biasing battery, C bat., and the plate circuit includes the energizing battery, B bat. There is also shown connected to the plate circuit through a transformer T' a suitable volt meter or other instrument V for indicating variations in plate current in a quantitive manner which I will hereinafter refer to for convenience as hum voltage. I show the filament F energized from an alternating current source S through a transformer T and the grid and plate circuits are connected to the filament through a potentiometer R having a variable contact.

I have observed the hum effects as indicated by the volt meter V in the case of a number of vacuum tubes of commercial design and will illustrate and describe the results of observations of two typical types of tubes. In these observations I used unusual care to connect the grid to the center point of the potentiometer R in order to eliminate variations in the potential of the grid G. The exact character of these variations will be more fully pointed out and explained hereafter, in connection with Figure 9 of the drawing.

Figure 6 illustrates the results of tests made upon one type of tube. This tube had a very thin filament designed to operate at white heat with about three volts across the filament terminals and .06 amperes through the filament. The filament was of the straight type instead of bent or hairpin-shaped. In Figure 6 abscissæ represent filament alternating voltages across the filament terminals of the tube, the filament voltage being varied by adjustment of the variable resistance R' shown in Figure 5. Ordinates in Figure 6 represent resulting plate currents as the filament voltage is varied for a given plate potential and given grid bias. In this case the plate potential was 90 volts and the grid bias —4.5 volts which are the normal operating voltages for the tube as an amplifier. The curve $I_p$ shown in Figure 6 is the usual plate current characteristic curve, in this case being that due to the change in the filament temperature through change in filament potential. The curve $E_h$ represents the intensity of hum as measured by the volt meter V connected to the plate circuit as shown in Figure 5. It is seen that the hum becomes a maximum early in the stage of increasing the filament voltage at about the point where the plate current characteristic curve is steepest, then rapidly falls off to a minimum at about 3½ volts, and then increases as the filament voltage is increased beyond the normal operating value. It is thus seen that the minimum occurs at a nearly horizontal portion of the plate or space current characteristic curve, which is a portion where increase or decrease of the filament temperature by changing filament potential, and therefore heating current, produces relatively small change in space current under the influence of the particular plate voltage and grid bias compared to space current changes at other portions of the curve; and that this minimum is not necessarily at the best filament voltage for operating the tube as an amplifier.

Figure 7 represents the results obtained with another tube viz., the tube illustrated in Figures 2 to 4. The curves were taken with the normal operating plate voltage of the tube of 135 and normal grid voltage of —4.5. The volts in Figure 7 are drawn to the same scale as in Figure 6. It is seen that the plate current, as represented by the characteristic curve $I_p$, was considerably in excess of that of the first tube. The resulting hum is represented by the curve $E_h$, and it did not reach a maximum until the filament voltage was increased to about 3½ volts, but again the maximum occurred at about the midpoint of the steepest portion of the plate current curve. At about 4½ volts the hum decreased to practically zero value, as compared to the first tube which had a minimum value about equal to the maximum value of the second tube, the first tube's maximum value being about 9 times that of the maximum value of the second tube. After reaching the practically no value at 4½ volt the hum increased slowly up to and through the normal operating filament voltage. It will thus be seen that the second tube offers far superior characteristics for operating with alternating current on the filament than does the first tube, and further that the point of minimum hum with the second tube occurs at 4½ volts, which is quite near the normal 5 volt point of operation, and which difference does not change the amplifying ability of the tube to any objectionable degree, while with the first tube the minimum occurs at about 3½ volts, which is quite well removed beyond the normal operating voltage and would make a substantial difference in the life of the tube. As in the case of Fig. 6 it will be noted that the minimum occurs after the filament current reaches that region where relatively large changes of filament temperature produce relatively small changes in space current.

Figure 8 represents a measurement made with the same tube as Figure 7, but in this case the grid bias was changed from —4.5 to —9 volts. It will be seen that this change of grid voltage reduced the plate current, as shown by the plate current characteristic curve $I_p$, and also showed the steepest part of the characteristic curve to be had at a lower filament voltage. It is seen from the hum curve $E_h$ that the hum was as before a maximum at the steepest portion of the curve. Further that the point of minimum hum occurred short of 4 volts and did not reach zero value, and thereafter rose quite rapidly, so that the hum at the 4½ volts of Figure 7 was in Figure 8 quite substantial. It is still to be noted that the minimum occurs in the same region of the space current characteristic as before, but in this case too far removed from the normal amplifying operating voltage of the tube for efficiency if operated at the filament voltage for this minimum to avoid hum.

I have found by experiments involving changes of plate current on the same tube that hum curves can be obtained not nearly so favorable in their characteristics as the one shown in Figure 7, and by numerous measurements of various tubes have found that the particular one with the particular adjustments of Figure 7 presents the most favorable characteristics for hum elimination of the commercial tubes now available.

While I do not wish to limit myself to any specific theory in explanation of the varying hum effects which I have observed in different tubes and under different operating adjustments, my experience leads me to believe that certain definite conditions contribute to a large extent toward the production of such effects.

In considering the effect which will be produced in case the grid is connected to some other point of the alternating current filament supply circuit than the neutral point, that is, in case the contact of the potentiometer R in Figure 5 is positioned at some other than the midpoint of the potentiometer resistance, the grid will, in this case, be subjected to a varying potential relative to the filament.

In Figure 9 I represent by the dotted line $a$ the steady current $I_p$ that would flow in the plate circuit with a given steady potential of the plate or B battery for some steady grid bias of the grid or C battery, if the filament were energized by a steady source of potential. However, with the filament energized from an alternating current source of potential, there will be fluctuations of grid potential due to the connection of the grid to the filament unless the connection is made to the potentiometer R so precisely in the midpoint that there is no variation of potential at that point. If the contact is made either to the right or left of the midpoint the grid potential will vary in amount depending upon the removal of the contact from the exact midpoint, and cause the plate current to vary in the manner represented by the curve $b$ in Figure 9. It is apparent that if the contact is to the right of the midpoint the variations in the plate current will be in opposed phase to those which would occur if the contact were to the left of the midpoint. It is to be noted that by adjusting the contact I can control the degree and the phase of variations arising from this source. It is seen that the variations in the plate current are of the same frequency as the alternating current source. The volt meter V connected to the plate circuits will give an indication of the hum voltage resulting from this cause.

I will now consider what I deem to be a second cause for variations in the plate circuit. The amount of plate current depends upon the rate at which electrons reach the plate P from the filament F. The number which reach the plate of course depends upon the number of electrons available. Since there is an alternating difference of potential applied to the filament, it is apparent that one leg of the filament is alternately positive and negative with respect to the other leg, with instances of no difference of potential between the legs as the alternations take place. When the right hand leg, for instance, is positive I have reason to believe that this leg attracts and absorbs some of the electrons emitted by the left hand negative leg, and vice versa, so that twice during a cycle of alternating current the plate is robbed of some of the available electrons, and the current in the plate circuit accordingly reduced. Likewise, twice during a cycle when both legs of the filament are neutral, there is no robbing from the plate, and the plate current is allowed to become normal. This is shown in Figure 10 where the dotted line $a$ represents the normal steady plate current, and the curved lines $b$ below $a$ represent the impulsive reduction of the plate current due to the robbing effect. It will be seen that this effect occurs at double the frequency of the alternating current. This effect can be controlled in degree by the design of the filament as well as the potential of operation of filament voltage for any given design. If the filament, instead of being hairpin in shape, as shown in Figure 5, is spread out more or less even to a straight wire, as is the case in the construction of some commercial types of vacuum tubes, the effect is reduced by thus increasing the distance over which the alternating difference of potential must act. Also if the filament is designed to employ low voltage across its terminal with high current for heating, the difference of potential between points in the filament is thereby reduced, thus reducing the effect. Again, if the filament is designed to operate with a given normal potential, operating it at some point below this normal potential will reduce the robbing effect. Also the robbing effect will depend upon the relative values of the plate voltage and the voltage across the filament terminals. If the plate voltage is large compared to the voltage across the filament terminals, the force arising in the plate to draw the electrons to the plate will correspondingly predominate over the forces acting between the two legs of the filament. I have also noted that the amount of grid bias influences the effect, this being probably due to a negative grid bias having the effect of stopping electron flow to the plate, which is in effect a reduction of plate voltage, and thereby allowing the robbing effect to become more pronounced.

Considering a third effect due to energizing the filament from an alternating current source, it is well known that the number of electrons emitted from a filament of a given substance depends upon its temperature, the higher the temperature the more electrons emitted. With the filament energized by an alternating current there is some tendency for the filament to vary in temperature twice during each cycle as the current changes from positive to negative through zero or no current, thereby changing the number of electrons available for flow to the plate. I have shown this effect in Figure 11 where the dotted line $a$ represents the steady plate current $I_p$, which would flow under fixed conditions, and the rising impulses that occur due to increase of electron emission with temporary variation by the curve $b$. It will be noted that the robbing effect just discussed occurs when the alternating current cycles are at maxima, and tend to reduce the plate current, while the temperature effects which occur at these maxima tend to increase the plate current, thereby giving rise to the possibility of the robbing effect being offset or overcome by the temperature effect. It is quite possible that there is a tendency of the temperature effect to lag behind its cause more than in the case of the robbing effect, so that the two effects are not precisely in opposed phase, but my observations have been that there is sufficient opposition of phase to make it possible to utilize one against the other. The temperature effect is subject to control, particularly through the design of the filament. If the filament is of fine wire operated at quite high temperature, as is the case with some commercial tubes, the electron variation due to temperature change is most marked. This may be reduced by increasing the diameter of the filament to permit of operating at lower temperature, and yet maintain the desired amount of electron emission by increasing the surface area. This increase in the size to maintain equality of emission has the further beneficial effect of increasing the mass, which aids in maintaining high temperature inertia. This increasing of size is also helpful towards reducing the robbing effect because it means that lower voltage may be used across the terminals of the filament. This, of course, requires the use of larger currents, and while this would be a decided disadvantage in battery operation, it is no disadvantage whatsoever in alternating current operation, it being a matter of simple design of transformer to give any desired current with no ill effects from having the current large.

In Figure 12 I endeavor to illustrate what appears to me to be a plausible explanation of the investigations I have made of the hum characteristics of numerous tubes, the explanation being based upon the robbing effect explained in Figure 10, in conjunction with the temperature effect explained in Figure 11. I conceive that as the filament voltage is increased the temperature effect may be represented by the curve $E_T$ of Figure 12, the temperature effect being a substantial maximum early in the increasing of the filament voltage and falling away to a low value as the voltage is further increased, the maximum occurring where the characteristic curve is steepest and thus where a small change in the conditions makes the greatest change in the plate current, and becoming less as the characteristic curve flattens out, so that large change in the conditions makes no very great change in the plate current. I also conceive that as the filament voltage increases, the robbing effect increases for two reasons, (1) greater emission makes more electrons available to the robbing effect and (2) higher voltage across the filament renders the robbing effect more powerful. Thus I conceive that the hum resulting from this effect can be represented by the curve $E_V$, showing the effect to steadily increase with filament voltage. Now I have shown in Figures 10 and 11 how the two effects may be opposed, and I conceive that with tubes having the right characteristics, it is quite possible for the two effects to be equal and opposed at some point X, with the result that no hum is produced from these two causes at this point. I conceive that the two effects may well combine to produce the dotted hum curve $E_h$, this corresponding quite well to the curve I have found by actual investigation as represented in Figure 7.

It will thus be seen that a very satisfactory tube is one arranged to have the lowest possible temperature variation conditions and the lowest possible robbing effect conditions, so that, referring to Figure 7, the minimum might be further broadened so that the particular tube could be operated at a normal filament voltage for maximum amplification with no resulting hum. Such a result is readily realizable in a tube having a filament designed to work with about ½ volt and 2 amperes current, with sufficient surface to give substantial electron emission at a rather low temperature and sufficient mass to keep the temperature inertia quite high at this helpful low temperature, and having a straight or suitable form of filament so as to reduce to a minimum the robbing effect by separating points of the filament having substantially different potentials as far as possible from one another. It is to be noted that the filament of tube shown in Figures 2 and 3, although of bent form, is so shaped that any two points of the filament between which there is a substantial difference of potential, are located a substantial distance apart.

If some one portion of a vacuum tube filament were spaced considerably nearer to the plate or grid of the tube than other portions of the filament, and if this closer spaced portion were subject to a constant change in potential due to alternating current in the filament, there would be apt to result a variation in the plate current due to such unsymmetrical spacing. In considering the form and arrangement of the filament, grid and plate in the tube shown in Figures 2 to 4, the provisions and results outlined have the effect of greatly lowering both curves $E_t$ and $E_v$ of Fig. 12 throughout, so that curve $E_h$ will be lowered throughout to give a much broader minimum at the point $x$, and also a more perfect minimum because the neutralizing will be done by small opposing effects with small residual if any, rather than the possibility of large residual from opposing effects of large value, as is demonstrated in the case of the poorly adapted tube responsible for the curve $E_h$ of Fig. 6.

It will be noted that the bent filament lies in a plane and that the grid wire and plate sides lie in planes substantially parallel to the plane of the filament. This construction permits an even spacing of the grid and plate from the filament, and so avoids the possibility of plate current variations due to the uneven spacing of these elements. Furthermore, the filament in the tube disclosed in Figures 2 to 4 is of such a form that the alternating magnetic flux produced in the neighborhood of the filament, caused by the alternating filament current has little or no tendency to produce variations in the plate current by causing variations in the flow of electrons from the filament to the plate.

As previously stated, I may, if desired, employ several stages of audio amplification, and in such case may employ a power tube for the last stage. This power tube need not necessarily have the particular characteristics of the tube shown in Figures 2 to 4, and may be of such a character as to produce variations in the plate current which I have described. I find that these variations in the last tube can be neutralized to a desirable extent by introducing into the grid circuit of the last tube variations out of phase with the variations produced in the last tube. To this end I find that the contact 47 of the grid leads on potentiometer 46 is most helpful.

By adjusting this contact I can subject the grid of the last tube to variations which compensate for variations produced in the last tube. The adjustability of the contact 47 to points at one or the other side of the midpoint of potentiometer 47 permits such variations impressed on the grid, to be varied not only in amount but in phase as well. It is, of course, not necessary to leave such adjustment variable for the final operator for a commercial radio set, as this adjustment can be established in the fabrication of the set and left in fixed form.

For the purpose of brevity and definiteness in setting forth the invention to be defined in the claims annexed hereto, I give the following distinctive terms and definitions therefor as applied to the characteristic curves set forth in Figs. 7, 8 and 12 hereinbefore fully described.

*Emission curve:* The curve $I_p$ in Figs. 7 and 8 which graphically shows the relation of the space current between the filament and plate to the filament potential as the filament potential is altered to alter the temperature of or emission from the filament while the filament is under the influence of energizing potentials applied to the plate and grid for operation of the tube as an amplifier, but irrespective of the signal variations impressed upon such potentials during operation of the tube.

*Origin of emission saturation:* The point of maximum curvature at the upper bend of the emission curve, and beyond which relatively large change in filament temperature or voltage produces but small change in effective space current.

*Hum curve:* Curves $E_h$ of Figs. 7, 8 and 12 graphically showing the relation between amplitude of space current variations resulting from filament current and voltage variations and the average filament voltage as the filament voltage is altered when the filament is supplied with alternating current in the presence of plate and grid electrodes energized for normal operation of the tube as an amplifier, but irrespective of the signal variations impressed upon such potentials during operation of the tube, which curve depends upon the combination of the varying temperature and varying electrical effects arising from the alternating current energization, the analyzation of which is graphically shown as curves $E_t$ and $E_v$ of Fig. 12.

*Hum minimum:* The region in the hum curve where the neutralization as between the varying temperature effects and varying electrical effects is maximum, which region is typified in Fig. 7 as that portion of the curve $E_h$ between the abscissæ 4.5 and 5.0 in Fig. 8 as that portion of the curve $E_h$ included between the abscissæ 3.5 and 4.0, and in Fig. 12 as that portion of the curve $E_h$ included between the abscissæ 3.5 and 4.5.

I claim:

1. In a system for amplifying alternating current the combination of a vacuum tube having grid and plate electrodes, circuits associated with said electrodes, means in said circuits for energizing said electrodes at potentials normal thereto for amplifying purposes, a thermally operated filament in said tube treated to be effectively electron emissive at low temperature, said filament being physically and electrically proportioned to be effectively heated by a current in amperes substantially the same or greater than the impressed potential in volts, and means for passing alternating current through said filament for heating the same, said means being adjusted to supply a current of magnitude to produce a temperature of said filament at which relatively large change of temperature produces relatively small change of space current in said tube under the influence of said grid and plate potentials and to produce electrical effects on the space current of said tube having maximum neutralization effect on changes of space current due to changes of temperature of said filament.

2. In an electrical system including an electron tube having a filament, grid and plate, and input and output circuits therefor, the method of energization which consists in energizing said filament with alternating current, and so selecting the energizing of said filament with said alternating current that the disturbing electrical effects are apportioned and phased relative to the disturbing temperature effects that the said effects have a maximum of neutralization effect on each other, whereby the space current discharge of said tube has a minimum of variation due to said effects.

3. In an electrical amplifying system including an electron tube having a filament, grid and plate, and input and output circuits therefor, the method of energization which consists in energizing the grid and plate relative to the filament of said tube whereby said tube operates as an amplifier, heating said filament with alternating current to the temperature above the origin of emission saturation on the emission curve of said tube, and so selecting the energizing of said filament with said alternating current that the disturbing electrical effects are apportioned and phased relative to the disturbing temperature effects that the said effects have a maximum of neutralization effect on each other, whereby the space current discharge of said tube has a minimum of variation due to said effects.

4. In an electrical system including an electron tube having a filament, grid, and plate and input and output circuits therefor, the method of energization which consists in energizing said filament with alternating current, and determining and phasing the disturbing electrical effects relative to the disturbing temperature effects produced in the space current discharge of said tube by said alternating current energization by maintaining the current in amperes flowing through said filament at a numerical value not greatly differing from the average potential in volts of said alternating current energization, and maintaining the temperature of said filament at said potential and amperage at an average temperature at least as low as the effective electron emission temperature of strontium oxide, and further so selecting the energizing of said filament with said alternating current that the disturbing electrical effects are apportioned and phased relative to the disturbing temperature effects that the said effects have a maximum of neutralization effect on each other, whereby the space current discharge of said tube has a minimum of variation due to said effects.

5. In a system for amplifying alternating current, the combination of a vacuum tube having grid and plate electrodes; circuits associated with said electrodes, means in said circuits for energizing said electrodes for operation of said tube as an amplifier, a thermally operated electron emissive filament in said tube having an emission curve including an origin of emission saturation at a temperature of said filament at least as low as the effective electron emissive temperature of strontium oxide, said tube having a hum curve including a region of hum minimum, and means for energizing said filament with alternating current, said means being adjusted to supply said alternating current to said filament at a potential higher than the potential at said origin of emission saturation and within the range of potentials across said filament corresponding to said region of hum minimum.

6. In a system for amplifying alternating current, the combination of a vacuum tube having grid and plate electrodes; circuits associated with said electrodes, means in said circuits for energizing said electrodes for operation of said tube as an amplifier, a thermally operated electron emissive filament in said tube having an emission curve including an origin of emission saturation at a temperature of said filament at least as low as the effective electron emissive temperature of strontium oxide and at a potential across the terminals of said filament of less than three volts, said tube having a hum curve including a region of hum minimum, and means for energizing said filament with alternating current, said means being adjusted to supply said alternating current to said filament at a potential higher than the potential at said origin of emission saturation and within the range of potentials across said filament corresponding to said region of hum minimum.

7. In a system for amplifying alternating current, the combination of a vacuum tube having grid and plate electrodes; circuits associated with said electrodes, means in said circuits for energizing said electrodes for operation of said tube as an amplifier, a thermally operated electron emissive filament in said tube having an emission curve including an origin of emission saturation at a temperature of said filament at least as low as the effective electron emissive temperature of strontium oxide, and at a potential across the terminals of said filament of less than two volts, said tube having a hum curve including a region of hum minimum, and means for energizing said filament with alternating current, said means being adjusted to supply said alternating current to said filament at a potential higher than the potential at said origin of emission saturation and within the range of potentials across said filament corresponding to said region of hum minimum.

8. In a system for amplifying alternating current, the combination of a vacuum tube having grid and plate electrodes; circuits associated with said electrodes, means in said circuits for energizing said electrodes for operation of said tube as an amplifier, a thermally operated electron emissive filament in said tube having an emission curve including an origin of emission saturation at a temperature of said filament at least as low as the effective electron emissive temperature of strontium oxide, and at a potential across the terminals of said filament of less than one volt, said tube having a hum curve including a region of hum minimum, and means for energizing said filament with alternating current, said means being adjusted to supply said alternating current to said filament at a potential higher than the said origin of emission saturation and within the range of potentials across said filament corresponding to said region of hum minimum.

9. In a system for amplifying alternating current, the combination of a vacuum tube having grid and plate electrodes; circuits associated with said electrodes, means in said circuits for energizing said electrodes for operation of said tube as an amplifier, a thermally operated electron emissive filament in said tube having an emission curve including an origin of emission saturation at a temperature of said filament at least as low as the effective electron emissive temperature of strontium oxide and at a potential across the terminals of said filament of less than three volts, said tube having a hum curve including a region of hum minimum, and means for energizing said filament with alternating current, said means being adjusted to supply said alternating current to said filament at a potential higher than the potential at said origin of emission saturation and within the range of potential across said filament corresponding to said region of hum minimum and at an amperage not greatly differing from the filament potential corresponding to said origin of emission saturation.

10. In a system for amplifying alternating current, the combination of a vacuum tube having grid and plate electrodes; circuits associated with said electrodes, means in said circuits for energizing said electrodes for operation of said tube as an amplifier, a thermally operated electron emissive filament in said tube having an emission curve including an origin of emission saturation at a temperature of said filament at least as low as the effective electron emissive temperature of strontium oxide, and at a potential across the terminals of said filament of less than two volts, said tube having a hum curve including a region of hum minimum, and means for energizing said filament with alternating current, said means being adjusted to supply said alternating current to said filament at a potential higher than said origin of emission saturation and within the range of potentials across said filament corresponding to said region of hum minimum and at an amperage not greatly differing from the filament potential corresponding to said origin of emission saturation.

11. In a system for amplifying alternating current, the combination of a vacuum tube having grid and plate electrodes; circuits associated with said electrodes, means in said circuits for energizing said electrodes for operation of said tube as an amplifier, a thermally operated electron emissive filament in said tube having an emission curve including an origin of emission saturation at a temperature of said filament at least as low as the effective electron emissive temperature of strontium oxide, and at a potential across the terminals of said filament of less than one volt, said tube having a hum curve including a region of hum minimum, and means for energizing said filament with alternating current, said means being adjusted to supply said alternating current to said filament at a potential higher than said origin of emission saturation and within the range of potentials across said filament corresponding to said region of hum minimum and at an amperage not greatly differing from the filament potential corresponding to said origin of emission saturation.

12. In a system for amplifying alternating currents, the combination of an electron tube having an electron emissive filament, grid and plate; said tube having a hum curve including a region of hum minimum; said filament having an emission curve including an origin of emission saturation; said filament also having such length, resistivity and cross section that when energized by alternating current said hum minimum occurs at a filament potential greater than the filament potential of said origin of emission saturation, the temperature of said filament at said potential being at least as low as the effective electron emissive temperature of strontium oxide; means for energizing the filament-grid and the filament-plate space discharge paths of said tube to operate as an amplifier, and means for energizing the filament of said tube with alternating current of a voltage corresponding to the filament voltage of said hum minimum.

13. In a system for amplifying alternating current, the combination of a vacuum tube having grid and plate electrodes, circuits associated with said electrodes, means in said circuits for energizing said electrodes at potentials normal thereto for amplifying purposes, a thermally operated filament in said tube treated to be effectively electron emissive when heated, said filament being physically and electrically proportioned to be effectively heated by a current in amperes not greatly differing from the impressed potential in volts, and means for passing alternating current through said filament for heating the same, said means being adjusted to supply current of magnitude to produce a temperature of said filament at which relatively large change of temperature produces relatively small change of space current in said tube under the influence of said grid and plate potentials.

BENJAMIN F. MIESSNER.